United States Patent [19]

Samples

[11] 3,723,861
[45] Mar. 27, 1973

[54] EDDY CURRENT TEST PROBE USING AN OSCILLATOR MOUNTED IN A DIGITALLY MANIPULATABLE HOUSING

[76] Inventor: Everett L. Samples, 2916 S. W. 60th St., Oklahoma City, Okla.

[22] Filed: Sept. 28, 1970

[21] Appl. No.: 75,977

[52] U.S. Cl. ..................................324/40, 324/37
[51] Int. Cl. ..............................................G01r 33/12
[58] Field of Search ........324/37, 40, 41, 3; 331/146, 331/112

[56] References Cited

UNITED STATES PATENTS

| | | | |
|---|---|---|---|
| 2,993,167 | 7/1961 | Smith | 324/72.5 |
| 3,170,113 | 2/1965 | Harmon | 324/40 |
| 2,321,356 | 6/1943 | Berman | 324/41 |
| 3,546,628 | 12/1970 | Zitter | 324/3 |

FOREIGN PATENTS OR APPLICATIONS

| | | | |
|---|---|---|---|
| 1,104,255 | 11/1955 | France | 324/3 |
| 607,683 | 9/1948 | Great Britain | 324/37 |

OTHER PUBLICATIONS

Yanczer, P.; Blocking Oscillator Gives High–Speed Linear Ramp; Electronic Design 4, Feb 15, 1968; p. 122.

Primary Examiner—Robert J. Corcoran
Attorney—Dunlap, Laney, Hessin & Dougherty

[57] ABSTRACT

A device for eddy current testing of metals for cracks and the like including a sensing coil disposed in a contoured contact tip carried at one end of a hollow, cylindrical housing which houses electrical circuitry and a battery for powering the device. The electrical circuit is closed by plugging an earphone into a jack in the side of the housing, and the circuitry includes a blocking oscillator connected by a center tap to the sensing coil so that this single coil forms a portion of the tuned circuit of the oscillator. The blocking frequency developed by the circuit is in the audible range and is adjusted for purposes of metals testing by the use of a potentiometer connected in the control circuit. A change of the developed blocking frequency, as evidenced by a change in the signal heard at the earphone, is indicative of the presence of an anomaly in the metal under test.

7 Claims, 3 Drawing Figures

Patented March 27, 1973

3,723,861

INVENTOR
EVERETT L. SAMPLES

BY
Dunlap, Laney, Hessin & Dougherty
ATTORNEYS

EDDY CURRENT TEST PROBE USING AN OSCILLATOR MOUNTED IN A DIGITALLY MANIPULATABLE HOUSING

BACKGROUND OF THE INVENTION

1. Field of the Invention

This invention relates to metal testing devices, and more frequently, to devices for detecting anomalies in a metal structure, using the effect of such anomalies on eddy currents developed in the metal structure for providing a signal in an oscillator circuit contained within the device to provide a readout or indication verifying the presence of the anomaly.

2. Brief Description of the Prior Art

In the field of non-destructive testing of metals, both of the ferrous and non-ferrous types, eddy current detector devices have previously been utilized with considerable success. These devices, in general, utilize a detector coil which is placed in inductive relation to the metal part to be tested. The detector coil is excited by alternating current developed by an oscillator circuit. The amplitude or frequency of the output signal of the oscillator circuit is, in some types of eddy current detector devices, varied as the detector coil is placed in proximity to an anomaly in the metal. This is due to the anomaly causing fluctuations in the eddy currents present in the metal.

A number of types of eddy current detector devices of the type described have been heretofore proposed with various types of oscillator circuits being coupled to the sensing or detector coil, and various arrangements proposed for mounting the coil in the tip of a probe. These latter arrangements often seek to minimize the effect on the frequency of the oscillator circuit of variations in the distance of the probe from the test piece, or of the presence of coatings of paint and the like so that true signal variations due to the presence of cracks or other flaws sought to be detected are more accurately discerned. Difficulty has been encountered in many instances in eliminating spurious signals due to surface roughness of the metal under test, presence of oxide coatings, dirt, and the like. In some of the eddy current probe type instruments presently on the market, the surface of the metal must be thoroughly cleaned and smoothed before testing if any degree of accuracy is to be obtained. Other probe instruments require a jig to maintain the probe in a precise predetermined position with respect to the test piece during the testing, and a sensitive and rather large meter is used to provide an indication of the presence of cracks and other anomalies in the metal.

Three types of eddy current testing devices in which a sensing or detector coil is coupled to an oscillator circuit and depend in their usage upon the frequency of a signal developed thereby are disclosed in U. S. Pat. No. 2,939,073, U. S. Pat. No. 2,581,394, and U. S. Pat. No. 3,135,914. In each of these systems, however, as with substantially all eddy current testing devices now in use, the circuitry employed is complex, and requires considerable training and experience on the part of the operator in order to successfully operate the devices to make an accurate determination of the presence of cracks and other flaws in the metal under test. Moreover, many of the devices are very bulky and are difficult to transport from one location to the other. In some instances, the metal to be tested may be more conveniently brought to the situs of the test device than the device may be transported to the location of metal members to be subjected to testing.

In a currently widely used procedure for testing aircraft and other large metal structures for the presence of cracks or weakened zones, initial testing is frequently carried out by first inspecting the equipment visually by the use of a flashlight and magnifying glass. Such inspections frequently require the removal of paint or other surface coating in order to sufficiently verify the presence of a crack or other anomaly to indicate the desirability of further and more exact and comprehensive testing. At times, the structure under test must be disassembled to permit the part in which the flaw is located to be removed to a laboratory for non-destructive testing with sophisticated eddy current testing equipment. A real need has therefore existed for a very small portable testing device which can quickly and reliably indicate to the inspector in on-the-site inspections, the presence of any cracks or anomalies without the necessity of paint removal, and without the necessity of further more specific and exacting testing except in rare instances. For tests of this type, an instrument of the needed type also would necessarily be simple in its operation and easily used by an inspector having a minimal knowledge of electronics and little training in the use of the instrument.

BRIEF DESCRIPTION OF THE PRESENT INVENTION

The present invention is a portable eddy current test instrument capable of non-destructively inspecting metallic materials for surface, or slightly subsurface, defects and anomalies. The device may also be used for evaluating coating thicknesses, test piece conductivity, test piece permeability and material structural integrity by comparative testing with known standards.

Broadly described, the testing instrument of the invention comprises a small portable housing of generally cylindrical configuration having a generally conical probe or contact tip located at one end thereof. Within the probe, a sensing or detector coil is located, and this coil is center tapped and connected in parallel with a capacitor to form the inductive element in a tuned circuit comprising a portion of a blocking oscillator carried within the cylindrical housing. The blocking oscillator is powered by a small battery also carried within the housing at another location, with such blocking oscillator including a transistor powered by the battery and a feedback circuit for providing regenerative feedback to the transistor. A blocking frequency is developed by the circuitry, with control of this frequency provided by a potentiometer connected in the base-power supply circuit of the transistor.

The blocking oscillator circuitry is such that the detector coil reacts inductively to the eddy current developed in a metal test piece under examination, and concurrently provides an effective circuit element in the oscillator effecting both the normal frequency developed in the detector coil, and the blocking frequency developed by the oscillator which is used to actuate an earphone connected in the emitter circuit of the transistor. The earphone is arranged within the circuitry so that its connection in the circuit by inserting a plug-in jack operates to close the circuit and make it immediately operative. A variation in the blocking frequency is indicated by a change in the tone developed in the earphone, and such tone change provides the necessary audible indication of the presence of a flaw or anomaly in the metal under test.

From the foregoing description of the invention, it may be perceived that the present invention provides a compact, portable test instrument which may be utilized for non-destructive testing of metals utilizing the eddy current principle.

Another object of the invention is to provide an eddy current detector device which may be manually utilized by an inspector with little training and experience in the use of the instrument to determine, by the development of an audible signal, the presence of surface and subsurface defects in a metal specimen under test.

A further object of the invention is to provide a compact and portable eddy current detector device in which an earphone utilized to audibly indicate the presence of flaws or anomalies in a metal under test also functions as an ON-OFF switch for energizing and de-energizing the instrument so that the instrument is not inadvertently permitted to remain powered at times when it is not in use.

A further object of the invention is to provide an eddy current testing instrument utilizing a blocking oscillator circuit which permits a signal of more desirable, relatively high frequency to be passed through the detector coil used in the device, and an audible signal of lower frequency to be developed at an earphone included in another portion of the circuit.

A further object of the invention is to provide a testing technique for non-destructive testing of metals which effectively supplements visual inspection constituted by illumination of the metal under test, and examination of the metal under magnification.

Another object of the invention is to provide a small portable eddy current testing device for non-destructively testing metals, which device is battery powered by a battery of relatively small E.M.F. which is quickly replaceable in the device, and which powers a miniaturized, transistorized blocking oscillator circuit during the operation of the device.

Additional objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figure 1:
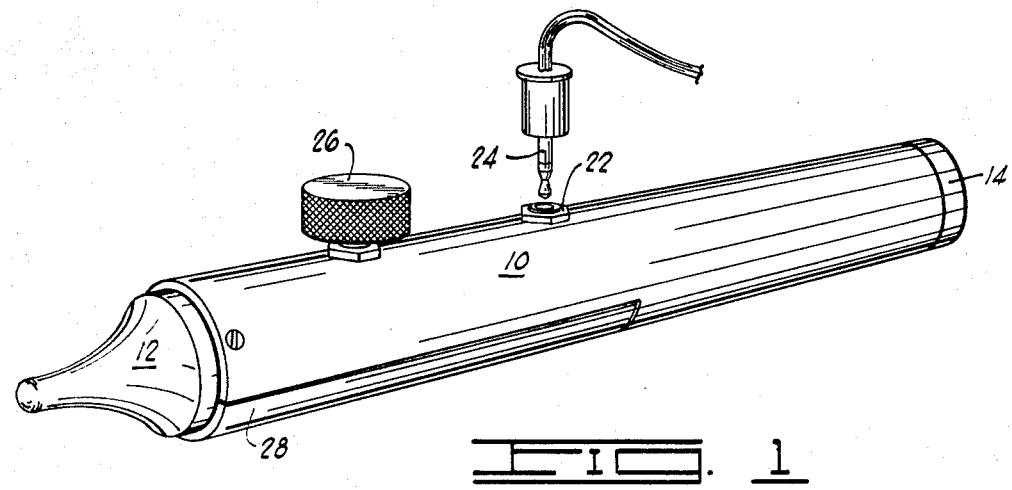
FIG. 1 is a perspective view of the eddy current testing device of the invention.

Referring initially to FIG. 1 of the drawings, shown therein is an elongated cylindrical housing 10 which has a frusto-conically shaped probe or contact element 12 mounted on one end thereof, and a closure cap 14 detachably retained on the other end by screws or other suitable means. The cylindrical housing 10 is partitioned by a plug 16 so that the housing is divided into a battery chamber 18 and a circuitry chamber 20. Opening into one side of the housing 10 is a jack socket 22 for receiving the plug or jack 24 of an earphone as hereinafter described. There is also provided in one side of the housing 10 an opening through which is mounted a shaft (not visible) connected at one of its ends to a frequency control knob 26 which functions in a manner hereinafter described.

Figure 2:
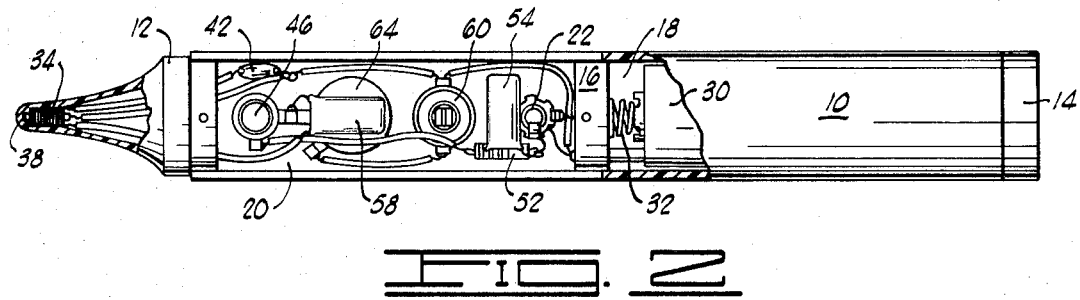
FIG. 2 is a side elevation view of the eddy current testing device with parts broken away and shown in section to illustrate certain circuit elements located within the housing of the testing device.

Access to the circuitry contained within the circuitry chamber 20 is had by removal of a plate 28 forming a portion of the side wall of the housing 10, and detachably retained in position by screws or other suitable means. In FIG. 2 of the drawings, the plate 28 is shown removed from the housing 10 and a portion of the housing adjacent the plate is broken away to show the battery chamber 18 containing a battery 30 for powering the instrument. The battery 30 is inserted in the battery chamber 18 through the open end of the housing 10 when the closure cap 14 has been removed. When the battery is positioned in the battery chamber 18, one end thereof bears against a spring contact 32 which is connected through the partition plug 16 to a portion of the circuitry disposed in the circuitry chamber 20. The opposite end of the battery is connected to a suitable electrical lead which passes along the wall of the housing 10 and also passes through the partition plug 16 for connection to the circuitry.

The conical probe 12 secured to one end of the housing 10 has a hollow interior and a specially shaped exterior which provides for uniform distribution of the lines of flux around the tip of the probe as hereinafter described. The tip of the probe 12 is rounded. Positioned inside this tip is a sensing or detector coil 34. The detector coil 34 includes a series of turns or convolutions of wire disposed in a bore in the tip of the probe 12 and surrounding a ferrite core 38. Leads extend from the coil 34 through the enlarged portion of the probe, and this portion of the probe is filled with a suitable potting material such as epoxy cement or the like.

Figure 3:
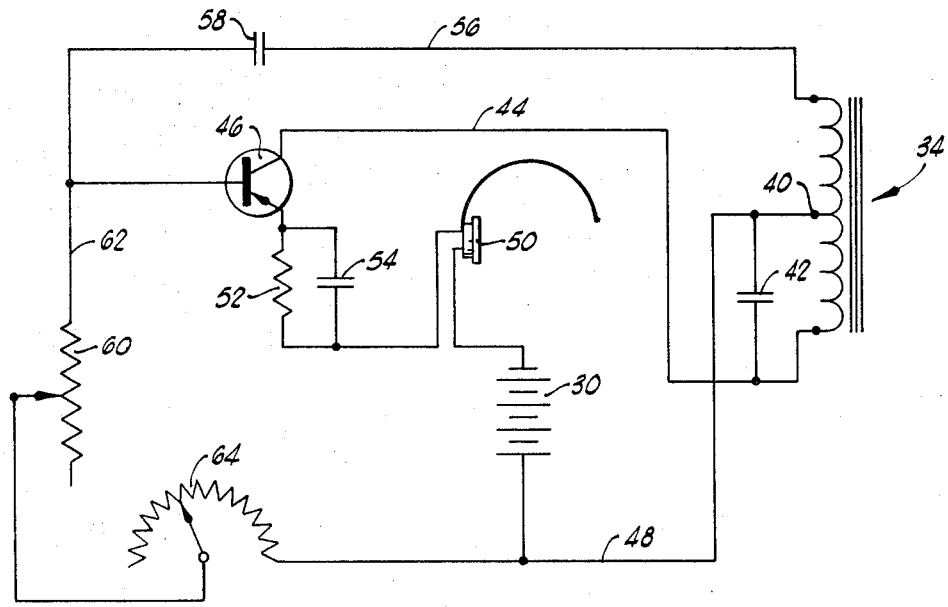
FIG. 3 is a circuit diagram depicting the electronic circuit utilized in the testing device of the invention.

The circuitry utilized in the eddy current testing instrument of the present invention is depicted in FIG. 3 of the drawings. The circuitry utilized is relatively simple as contrasted with other eddy current testing devices heretofore in use, and constitutes a blocking oscillator circuit which includes the detector coil 34. The coil 34 is center tapped at 40, with a portion of the detector coil connected in parallel with a capacitor 42 to provide a tuned circuit. Although a fixed value capacitor is illustrated in the drawing, a variable capacitor can be employed for adjusting the resonant frequency of the tuned circuit, and adjusting the frequency of the signal passed through the detector coil 34.

From the tuned circuit constituted by the capacitor 42 and coil 34 connected in parallel, an electrical lead 44 is extended to the collector of a common emitter transistor 46. Another lead 48 passes from the tuned circuit to the battery 30 used to power the circuit. The E.M.F. developed by the battery 30 may be relatively small and may range, for example, in various embodiments of the device, from about 1.5 volts to about 9 volts.

Connected between the battery 30 and the emitter of the transistor 46 is an earphone 50 which is connected into the circuit by plugging the jack 24 into the jack socket 22. In other words, until the jack 24 is plugged into the jack socket 22, the circuit of the instrument is open and no dissipation of power from the battery occurs. A current limiting circuit which is used to shape the pulses applied to the earphone 50 during the use of the device is connected between the earphone 50 and the emitter of the transistor 46, and includes a fixed resistance 52 and a capacitor 54. Regenerative feedback for the operation of the blocking oscillator is developed through the lead 56 which is connected to one end of the detector coil 34 and which contains a capacitor 58. The opposite end of the lead 56 is connected to the base of the transistor 46. The base circuit of the transistor contains a trimming resistor 60 connected in a lead 62 and also contains a potentiometer 64 which is connected to the positive side of the battery 30. The potentiometer 64 is utilized for varying the blocking frequency developed by the circuit, and adjusting the signal to the earphone 50 as hereinafter explained. The movable tap of this potentiometer is connected to the shaft which is connected at one end to the control knob 26.

OPERATION

In the operation of the eddy current testing instrument of the invention, the instrument is used most frequently to supplement visual inspection of metallic materials for defects or for anomalies in the metallic test specimen. In this usage, an area of the metallic part under observation will have been considered suspect because of visual indications such as cracks in coatings, scratches or the like, or because of some previous failure or defect patterns which have developed in the metal. Such symptoms of cracking or other defects are determined visually by inspection with a flashlight and/or a magnifying glass.

After locating such a suspect area, the inspector may then, without calling for special equipment, removal of the metal article to a laboratory, or the necessity for removing paint or other surface coatings, proceed to use the eddy current testing device of the present invention. Initially, the earphone 50 is connected into the blocking oscillator circuitry of the instrument by placing the jack 24 in the jack plug 22. This closes the circuits so that current can flow in the circuit from the battery 30. The probe 12 is then placed against the metal in the suspect area with the longitudinal axis of the cylindrical housing 10 extending substantially normal to the metal under test. In this connection, it is pointed out that the particular contour and geometric configuration of the probe, and particularly the rounded tip of the probe, provides an equalized flux density around this portion of the probe so that slight variations in the angulation of the instrument with respect to the surface of the metal under test do not result in spurious signals being developed by the instrument as a result of non-uniformity of the flux density around the coil 34 located in the tip of the probe.

With the test instrument in position with the tip of the probe against the metal, the control knob 26 is then rotated by the inspector so that the setting on the potentiometer 64 is varied. This has the result of varying the value of the blocking frequency actuating the earphone 50 so as to change the tone heard in the earphone. The control knob 26 is rotated until the tone heard in the earphone 50 by the inspector fades out— that is, becomes inaudible. Then the knob is rotated very slightly until the exact point in the rotation of the control knob is reached that the tone is recaptured or is again heard.

It may be noted that at this point in the procedure, a slight variation in procedure is involved in the case of the testing of ferrous metals as contrasted with non-ferrous metals. When ferrous materials are under test, the control knob 26 is set at the point at which the highest audible frequency occurs, and the tone persists in the earphone. With non-ferrous metals, on the other hand, the control knob is moved slightly past this point to the first point at which no tone continues to be heard.

With the instrument thus appropriately set, the probe 12 is then moved across the surface of the metal with the point of the probe in contact with the metal as it is moved. As the probe 12 moves across the metal due to digital manipulation of the housing 10, any defects present in the metal will be indicated by a loss or return of the tone heard in the earphone, depending upon whether ferrous or non-ferrous metals are being tested. In other words, in the case of ferrous metals, the tone which has been heard up to the location where a defect occurs will be lost as the tip of the probe passes over the crack or other defect in the metal. The opposite occurs in the case of non-ferrous metals and the tone is recaptured in this case as the defect is located. This procedure is continued until the entire metallic specimen is tested. At the end of the test, the earphone 50 is unplugged from the jack socket 22 to automatically disconnect the battery from the remainder of the circuit and prevent the power source from being dissipated prior to the next test.

Defect indication should always be rechecked for repeatability, and the visible causes for any reactions indicated by a change of tone in the earphone should be taken into account before making final determinations. Scratches or gouges, if relatively smooth, and if only occurring in the paint or other coating present on the metal, will not produce spurious signals indicative of cracks.

The principles upon which the present invention operates are, in general, well known in the art of nondestructive testing of metals. The detector coil 34 mounted in the tip of the probe 12 is designed and mounted in a manner such that it will provide a consistent coil-to-specimen relationship. Eddy currents induced in the metallic specimen by the coil's inductive flux react back through the flux to establish an inductive reactance in the oscillator circuit, and thereby, produce a characteristic basic frequency for that particular metallic material under test, and for that particular test configuration. The disruption of the eddy currents occurring in the test specimen and produced by cracks or other structural anomalies in the metal result in changes in the coil's inductive reactance, thus causing a change of frequency in the oscillator circuit.

In the case of the blocking oscillator used in the present invention, the change in the resonant frequency of the tank circuit formed by the capacitor 42 and a portion of the detector coil 34 effects the blocking frequency developed in another portion of the oscillator circuit and passed to the earphone 50. The blocking frequency is also determined by the setting of the potentiometer 64 and the effective value of the variable trimming resistor 60. These circuit elements are used to initially set the instrument so that the fade-out of the tone heard in the earphone, or near fade-out, are the set points of the instrument upon commencement of the test. The set value of the blocking frequency is then altered enough to make the tone fade out or be recaptured by the development of such alteration due to changes in the resonant frequency of the tank circuit as the inductive reactance of the coil 34 is changed when cracks or other anomalies are encountered.

It will be apparent, of course, that the frequency range employed in the testing, and characterizing the signal passed through the detector coil 34 is determined by the values of the capacitor 42 and that portion of the coil 34 which is connected in parallel with this capacitor. This frequency, which is termed the normal frequency, is substantially higher than the blocking audio frequency developed at the earphone 50, and this permits the advantage of obtainment of maximum flux saturation of the detector coil 34, and maximum eddy current generation in the metalic specimen under test. In a typical testing device such as the embodiment of the invention illustrated in the drawing, a normal frequency in the area of 350 kilohertz has been utilized, and a blocking frequency of about 1700 hertz has been employed. However, other values may be satisfactorily used, and the particular application of the device will determine the values of the normal and blocking frequencies which are employed.

The eddy current test instrument of the present invention offers many advantages over eddy current testing instruments heretofore in use. It is, of course, a test instrument designed for non-destructively inspecting metallic materials for surface or slightly subsurface defects according to principles now well known and understood. The instrument of the present invention is, however, a portable device having the power supply and electronic circuitry contained in a tubular probe assembly slightly larger than a standard pencil-type, two cell flashlight. The test signal is relatively easily understood and interpreted, consisting basically of a simple go-no go indication. The device does not normally require paint or coating removal in order to conduct an inspection, and may be effectively used to detect heat damaged areas and also for the purpose of separating and sorting metallic materials by comparative testing. For example, the device may be used to separate aluminum foils in 0.001 inch increments based upon differences in the location of the fade-out point of the tone heard in the earphone.

Although a preferred embodiment of the invention has been herein described, it is to be understood that various changes and modifications in the illustrated circuitry may be employed without departure from the basic principles of the invention. Changes and innovations of this type are therefore deemed to be circumscribed by the spirit and scope of the invention, except as the same may be necessarily limited by the appended claims or reasonable equivalents thereof.

What is claimed is:

1. An instrument for non-destructively testing metal comprising:

a transistorized blocking oscillator including:

a tuned tank circuit including a center tapped detector coil and a capacitor providing parallel inductive and capacitive reactance;

a regenerative feedback circuit; and a control circuit including a battery, a transistor, a potentiometer, and a variable trimming resistor for varying the blocking frequency of said blocking oscillator;

a housing containing said battery, said feedback circuit, said control circuit, and a portion of said tank circuit, said housing having an earphone jack opening in one side thereof and connected in said control circuit for closing said control circuit when an earphone is plugged into said jack; and a probe mounted on one end of said housing and containing said detector coil, said probe being a generally conically shaped contact member having a rounded tip and having said coil positioned in immediate juxtaposition to said tip.

2. An instrument for non-destructively testing metal as defined in claim 1 and further characterized as including an earphone plugged into said jack and closing said control circuit for responding to the blocking frequency of said oscillator.

3. An instrument as defined in claim 1 wherein said center tapped coil is disposed in convolutions around the axis of said contact member in a bore in said contact member provided therefor, and further including a soft iron core disposed concentrically in said coil and extending into a counterbore extending from said bore toward said rounded tip along the axis of said contact member.

4. An instrument as defined in claim 1 and further characterized to include:

a rotatable blocking frequency selector knob located outside said housing; and a shaft connected at one end to said frequency selector knob and extending through said housing for connection at its other end to the movable tap of said potentiometer.

5. An instrument as defined in claim 1 and further characterized to include a pulse shaping circuit comprising a resistor and capacitor connected in parallel between said earphone jack opening and the emitter of said transistor in the emitter circuit of the transistor for limiting current flow in said emitter circuit and shaping the pulses of the blocking frequency developed by said blocking oscillator.

6. In an eddy current testing instrument of the type including a detector coil for responding to fluctuations in eddy currents induced in a metallic test specimen, and an oscillator circuit developing an output frequency varying with the inductance of said detector coil, the improvement which comprises:

a cylindrical, digitally manipulatable housing containing said oscillator, and having an earphone jack in one side thereof, said jack being connected in said oscillator circuitry to provide switch contacts closeable upon plugging an earphone into said jack;

a battery disposed in said housing and connected in said oscillator circuit for powering said oscillator circuit;

a frequency varying element disposed in said oscillator circuit for varying the output frequency thereof;

said frequency varying element comprising a variable resistance, and a capacitor cooperating to provide selective variation of the output frequency of said oscillator circuit; and a digitally manipulatable frequency selector knob rotatably mounted on the outside of said housing and connected through said housing to said frequency varying element to facilitate selective variation of the output frequency of said oscillator circuit; and a tapered probe mounted on one end of said housing and adapted for containment of a detector coil in the tip of said probe; and an iron core detector coil mounted in said tapered probe immediately adjacent the tip thereof.

7. An eddy current testing circuit comprising:

a battery source of power;

a common emitter transistor connected to said battery;

an iron core detector coil arranged to be disposed in inductive relationship to metal to be tested;

a capacitor connected in parallel to a first portion of said detector coil through a center tap to form a tuned circuit developing a normal testing frequency;

a direct collector-to-base feedback circuit connected between said center tap of said coil and the base of the transistor and including, in series, a second capacitor and a second portion of said detector coil;

means included in the base circuit of said transistor for determining with said second capacitor, the value of a blocking audio frequency developed in said testing circuit, said means including:

a potentiometer; and a trimming resistor connected in series with said potentiometer;

an earphone connected in the emitter circuit of said transistor and responsive to said blocking audio frequency to emit an audible signal indicative of changes in the inductive reactance of said iron core detector coil; and a pulse shaping circuit comprising a resistor and capacitor connected in parallel between said earphone and the emitter of said transistor in the emitter circuit of the transistor for limiting current flow in said emitter circuit and shaping the pulses of the blocking frequency developed by said blocking oscillator.

* * * * *